US011115202B2

(12) United States Patent
Lee et al.

(10) Patent No.: US 11,115,202 B2
(45) Date of Patent: Sep. 7, 2021

(54) APPARATUS FOR GENERATING SECRET INFORMATION ON BASIS OF RING OSCILLATOR ARCHITECTURE AND METHOD OF SAME

(71) Applicant: ELECTRONICS AND TELECOMMUNICATIONS RESEARCH INSTITUTE, Daejeon (KR)

(72) Inventors: Sang Jae Lee, Daejeon (KR); Mi Kyung Oh, Daejeon (KR); You Sung Kang, Daejeon (KR); Ik Kyun Kim, Daejeon (KR); Doo Ho Choi, Cheonan-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 133 days.

(21) Appl. No.: 16/654,738

(22) Filed: Oct. 16, 2019

(65) Prior Publication Data

US 2020/0162249 A1 May 21, 2020

(30) Foreign Application Priority Data

Nov. 16, 2018 (KR) .......................... 10-2018-0142041

(51) Int. Cl.
*H04L 9/00* (2006.01)
*H04L 9/08* (2006.01)
(Continued)

(52) U.S. Cl.
CPC ....... *H04L 9/0861* (2013.01); *H03K 19/0963* (2013.01); *H03L 7/0995* (2013.01); *H04L 9/3278* (2013.01)

(58) Field of Classification Search
CPC ... H04L 9/0861; H04L 9/0963; H04L 9/0995; H04L 9/3278; H04L 2209/805; G06F 21/73
See application file for complete search history.

(56) References Cited

U.S. PATENT DOCUMENTS 9,448,874 B2 * 9/2016 Kim ........................ G11C 29/52
9,584,329 B1 * 2/2017 Trimberger ........... H04L 9/3278
(Continued)

FOREIGN PATENT DOCUMENTS

KR 1020150117284 A 10/2015
KR 1020180074613 A 7/2018

OTHER PUBLICATIONS

Cedric Marchand et al., "Implementation and Characterizaation of a Physical Unclonable Function for IoT: A Case Study With the TERO-PUF", IEEE Transactions on Computer-Aided Design of Integrated Circuits and Systems, vol. 37, No. 1, Jan. 2018.
(Continued)

*Primary Examiner* — Gary S Gracia
(74) *Attorney, Agent, or Firm* — Rabin & Berdo, P.C.

(57) ABSTRACT

Disclosed is a method of generating secret information on the basis of a ring oscillator. According to an embodiment of the present disclosure, there is provided an apparatus for generating secret information on the basis of a ring oscillator, the apparatus including: multiple PUF information generation units each including at least one ring oscillator cell and generating physically unclonable function (PUF) information generated by the at least one ring oscillator cell; a phase checking unit cross-checking phases for the multiple pieces of the PUF information that are output from the multiple PUF information generation units, respectively; and a secret key generation unit outputting secret key
(Continued)

information based on a result of comparing the multiple phases received from the phase checking unit.

10 Claims, 5 Drawing Sheets

(51) Int. Cl.
*H03K 19/096* (2006.01)
*H03L 7/099* (2006.01)
*H04L 9/32* (2006.01)
*H04L 17/02* (2006.01)

(56) References Cited

U.S. PATENT DOCUMENTS

| | | | | |
|---|---|---|---|---|
| 9,762,241 | B1* | 9/2017 | Augustine | H03K 3/84 |
| 2013/0082733 | A1* | 4/2013 | Shimizu | H04L 9/3278 |
| | | | | 326/8 |
| 2013/0156183 | A1* | 6/2013 | Komano | H04L 9/0866 |
| | | | | 380/44 |
| 2013/0254636 | A1* | 9/2013 | Kirkpatrick | H04L 9/0866 |
| | | | | 714/784 |
| 2014/0047565 | A1* | 2/2014 | Baek | H04L 9/3278 |
| | | | | 726/30 |
| 2014/0185795 | A1* | 7/2014 | Gotze | H04L 9/0866 |
| | | | | 380/44 |
| 2014/0225639 | A1* | 8/2014 | Guo | H04L 9/0866 |
| | | | | 326/8 |
| 2015/0067895 | A1* | 3/2015 | Vasyltsov | G06F 21/73 |
| | | | | 726/32 |
| 2015/0154421 | A1* | 6/2015 | Feng | G06F 7/588 |
| | | | | 726/34 |
| 2015/0163211 | A1* | 6/2015 | Chellappa | H04L 63/0876 |
| | | | | 713/155 |
| 2015/0178143 | A1* | 6/2015 | Mathew | G06F 7/00 |
| | | | | 714/5.1 |
| 2015/0278551 | A1* | 10/2015 | Iyer | G06F 21/70 |
| | | | | 726/2 |
| 2016/0156476 | A1* | 6/2016 | Lee | H04L 9/088 |
| | | | | 380/44 |
| 2017/0149572 | A1* | 5/2017 | Wallrabenstein | G06F 21/34 |
| 2018/0351753 | A1* | 12/2018 | Gardner | G06F 21/72 |

OTHER PUBLICATIONS

G. Edward Suh et al., "Physical Unclonable Functions for Device Authentication and Secret Key Generation", 2007 44th ACM/IEEE Design Automation Conference, pp. 9-14, Jun. 4-8, 2007.

Sangjae Lee et al., "Implementing a phase detection ring oscillator PUF on FPGA", 2018 International Conference on Information and Communication Technology Convergence (ICTC), pp. 845-847, Oct. 2018.

\* cited by examiner

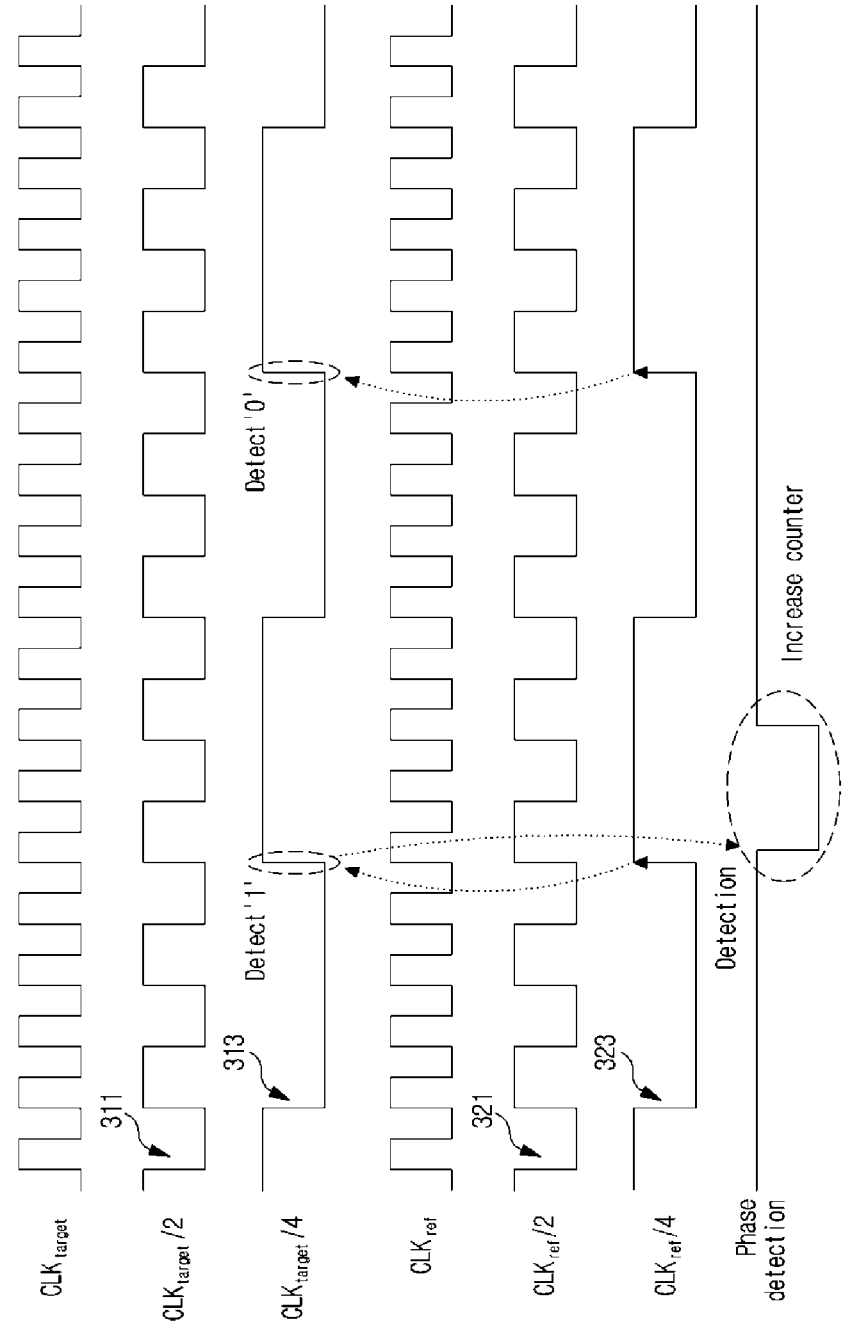

APPARATUS FOR GENERATING SECRET INFORMATION ON BASIS OF RING OSCILLATOR ARCHITECTURE AND METHOD OF SAME

CROSS REFERENCE TO RELATED APPLICATION

The present application claims priority to Korean Patent Application No. 10-2018-0142041, filed Nov. 16, 2018, the entire contents of which is incorporated herein for all purposes by this reference.

BACKGROUND OF THE INVENTION

Field of the Invention

The present disclosure relates generally to a digital fingerprint providing technology. Particularly, the present disclosure relates to a method and an apparatus for implementing a digital fingerprint in a hardware IP by using a physical unclonable function (PUF) based on a ring oscillator.

Description of the Related Art

As Internet of Things (IoT) technology expands, a large number of IoT devices are being developed and sold, and software security functions are installed to protect such IoT devices. Particularly, an IoT device is equipped with an encryption key or identification information (ID) for identifying device-specific information therein. However, recently, a number of cases have been reported in which security vulnerability is used to find the key or the ID for attack.

In the meantime, a physical unclonable function (PUF) is a technology for preventing a clone of a digital device, the technology checking whether a device is cloned by using the fact that in spite of the same circuit, wire delay and gate delay slightly vary according to the process variation of implementing the circuit.

The PUF is implemented with small gate logic and is able to generate random output easily. Further, a PUF circuit is made up of cells having the same circuit structure and is formed by the same manufacturing process, but the cells output slightly different values depending on manufacturing process variation.

That is, the PUF utilizes the different in delay according to the process situation, so even if the PUF circuit is published, it is difficult to construct circuits that execute the same output. With the feature of the PUF, the PUF generates element-specific recognition information like human fingerprint, and performs a physical duplication prevention function. That is, a minute difference between each of the cells of the PUF circuit is extracted for use like a fingerprint.

The foregoing is intended merely to aid in the understanding of the background of the present disclosure, and is not intended to mean that the present disclosure falls within the purview of the related art that is already known to those skilled in the art.

SUMMARY OF THE INVENTION

Further, for security of an IoT device, the designer or the user needs to set identification information (ID) or security information (for example, a password) for IoT device setting in the device itself. However, when using the PUF, it is possible to generate device-specific identification information or security information (for example, secret key information) without setting by the designer or the user.

The present disclosure is intended to propose a method and an apparatus for generating secret information by detecting a phase of a clock signal generated through a ring oscillator cell and by using the detected phase signal.

Also, the present disclosure is intended to propose a method and an apparatus for generating secret information by counting a phase of a clock signal generated through different ring oscillator cells and by using the result of the counting.

It is to be understood that technical problems to be solved by the present disclosure are not limited to the aforementioned technical problems and other technical problems which are not mentioned will be apparent from the following description to a person with an ordinary skill in the art to which the present disclosure pertains.

In order to achieve the above object, according to one aspect of the present disclosure, there is provided an apparatus for generating secret information on the basis of a ring oscillator, the apparatus including: multiple PUF information generation units each including at least one ring oscillator cell and generating physically unclonable function (PUF) information generated by the at least one ring oscillator cell; a phase checking unit cross-checking phases for the multiple pieces of the PUF information that are output from the multiple PUF information generation units, respectively; and a secret key generation unit outputting secret key information based on a result of comparing the multiple phases received from the phase checking unit.

According to another aspect of the present disclosure, there is provided a method of generating secret information on the basis of a ring oscillator, the method including: generating and outputting, by multiple physically unclonable function (PUF) information generation units each including at least one ring oscillator cell, PUF information; checking phases for the multiple pieces of the PUF information that are output from the multiple PUF information generation units; and generating secret key information by comparing values that result from counting the multiple phases corresponding to the multiple pieces of the PUF information.

It is to be understood that the foregoing summarized features are exemplary aspects of the following detailed description of the present disclosure without limiting the scope of the present disclosure.

According to the present disclosure, it is possible to provide a method and an apparatus for generating secret information by detecting a phase of a clock signal generated through a ring oscillator cell and by using the detected phase signal.

According to the present disclosure, it is possible to provide a method and an apparatus for generating secret information by counting a phase of a clock signal generated through different ring oscillator cells and by using the result of the counting.

According to the present disclosure, it is possible to provide a method and an apparatus that are capable of constructing a relatively large number of challenge-response pairs by generating secret key information using a phase of a clock signal generated through different ring oscillator cells.

Effects that may be obtained from the present disclosure will not be limited to only the above described effects. In addition, other effects which are not described herein will become apparent to those skilled in the art from the following description.

BRIEF DESCRIPTION OF THE DRAWINGS

The above and other objects, features and other advantages of the present disclosure will be more clearly understood from the following detailed description when taken in conjunction with the accompanying drawings, in which:

FIGS. 3A and 3B are diagrams illustrating timing of a signal used in an apparatus for generating secret information according to an embodiment of the present disclosure.

DETAILED DESCRIPTION OF THE INVENTION

Figure 1:
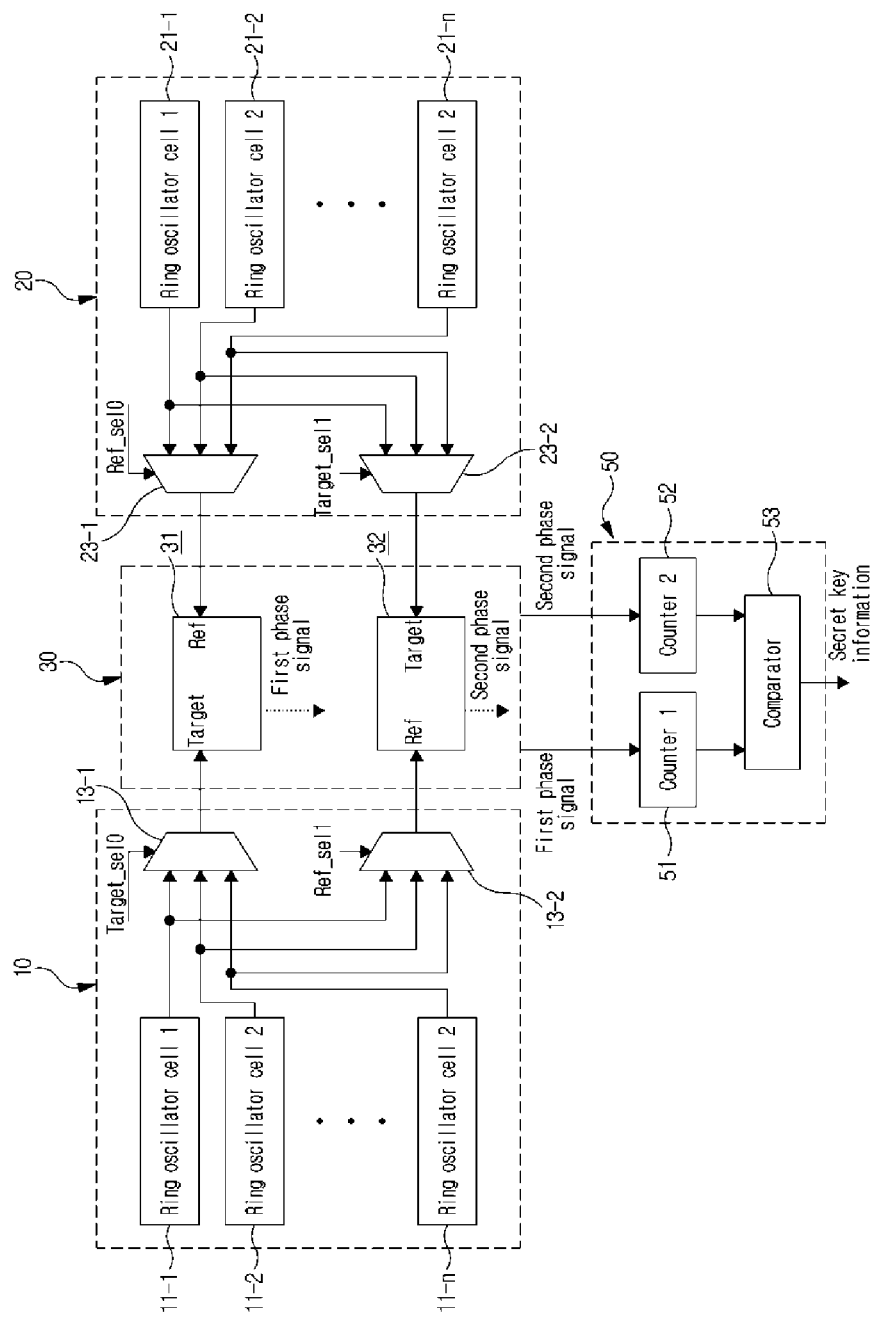
FIG. 1 is a block diagram illustrating a configuration of an apparatus for generating secret information according to an embodiment of the present disclosure.

Hereinbelow, exemplary embodiments of the present disclosure will be described in detail with reference to the accompanying drawings such that the present disclosure can be easily embodied by one of ordinary skill in the art to which this invention belongs. However, the present disclosure may be variously embodied, without being limited to the exemplary embodiments.

In the description of the present disclosure, the detailed descriptions of known constitutions or functions thereof may be omitted if they make the gist of the present disclosure unclear. Also, portions that are not related to the present disclosure are omitted in the drawings, and like reference numerals designate like elements.

In the present disclosure, when an element is referred to as being "coupled to", "combined with", or "connected to" another element, it may be connected directly to, combined directly with, or coupled directly to another element or be connected to, combined directly with, or coupled to another element, having the other element intervening therebetween. Also, it should be understood that when a component "includes" or "has" an element, unless there is another opposite description thereto, the component does not exclude another element but may further include the other element.

In the present disclosure, the terms "first", "second", etc. are only used to distinguish one element, from another element. Unless specifically stated otherwise, the terms "first", "second", etc. do not denote an order or importance. Therefore, a first element of an embodiment could be termed a second element of another embodiment without departing from the scope of the present disclosure. Similarly, a second element of an embodiment could also be termed a first element of another embodiment.

In the present disclosure, components that are distinguished from each other to clearly describe each feature do not necessarily denote that the components are separated. That is, a plurality of components may be integrated into one hardware or software unit, or one component may be distributed into a plurality of hardware or software units. Accordingly, even if not mentioned, the integrated or distributed embodiments are included in the scope of the present disclosure.

In the present disclosure, components described in various embodiments do not denote essential components, and some of the components may be optional. Accordingly, an embodiment that includes a subset of components described in another embodiment is included in the scope of the present disclosure. Also, an embodiment that includes the components described in the various embodiments and additional other components are included in the scope of the present disclosure.

Hereinafter, embodiments of the present disclosure will be described with reference to the accompanying drawings.

FIG. 1 is a block diagram illustrating a configuration of an apparatus for generating secret information according to an embodiment of the present disclosure.

Referring to FIG. 1, an apparatus for generating secret information includes first and second PUF information generation units 10 and 20, a phase checking unit 30, and a secret key generation unit 50.

The first PUF information generation unit 10 may include one or more ring oscillator cells 11-1, 11-2, ..., and 11-$n$, and one or more MUXs 13-1, 13-2. Further, each of the MUXs 13-1 and 13-2 may selectively output a clock signal that is output from each of the ring oscillator cells 11-1, 11-2, ..., and 11-$n$.

Similarly, the second PUF information generation unit 20 may include one or more ring oscillator cells 21-1, 21-2, ..., and 21-$n$, and one or more MUXs 23-1 and 23-2. Further, each of the MUXs 23-1 and 23-2 may selectively output a clock signal that is output from each of the ring oscillator cells 21-1, 21-2, ..., and 21-$n$.

The phase checking unit 30 cross-checks a phase between first and second PUF information output from the first and the second PUF information generation units 10 and 20.

Specifically, the phase checking unit 30 may include a first phase processing unit 31 that checks, on the basis of the second PUF information output from the second PUF information generation unit 20, a phase of the first PUF information output from the first PUF information generation unit 10. To this end, the first phase processing unit 31 receives the first PUF information as a target signal and receives the second PUF information as a reference signal, and outputs a first phase signal.

Further, the phase checking unit 30 may include a second phase processing unit 32 that checks, on the basis of the first PUF information output from the first PUF information generation unit 10, a phase of the second PUF information output from the second PUF information generation unit 20. The second phase processing unit 32 receives the second PUF information as a target signal and receives the first PUF information as a reference signal, and outputs a second phase signal.

Each of the first and the second phase signals may be a signal generated on the basis of a clock signal that is output from at least one ring oscillator cell.

The secret key generation module 50 may output secret key information based on the result of comparing the first and the second phase signals that are provided from the phase checking unit 30. Specifically, the secret key generation module 50 may include a first counter 51 and a second counter 52 which count values of the first and the second phase signals, respectively. Further, the secret key generation module 50 may include a comparator 53 that compares values of the first counter 51 and the second counter 52, and may generate the result value that is output through the comparator 53, as the secret key information for outputting.

In the embodiment of the present disclosure, it is described that the apparatus for generating secret information includes the first and the second PUF information generation units 10 and 20; on the basis thereof, the phase checking unit 30 checks the first and the second phase signals corresponding to the first and the second PUF information; and the secret key generation module 50 generates secret key information based on the first and the second phase signal, but the present disclosure is not limited thereto. The apparatus for generating secret information may include multiple PUF information generation units that generate multiple pieces of PUF information, and according thereto, the configuration of the phase checking unit 30 and the secret key generation module 50 may be changed.

Figure 2:
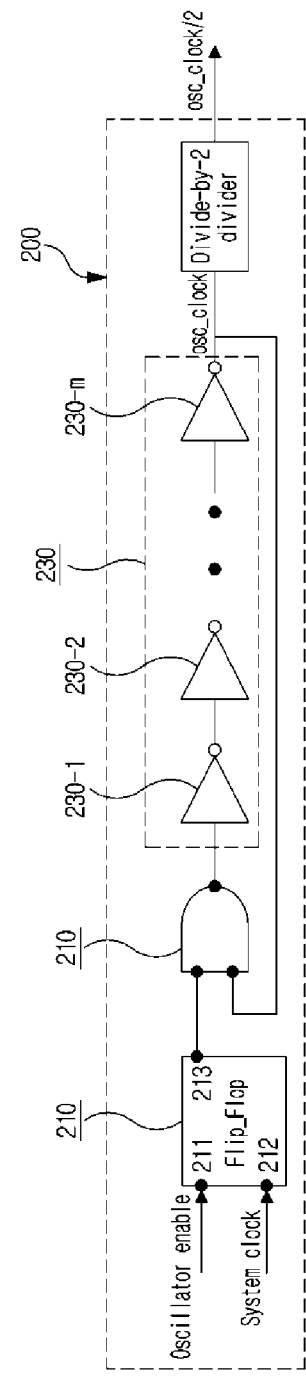
FIG. 2 is a diagram illustrating an example of a detailed configuration of a ring oscillator cell provided in an apparatus for generating secret information according to an embodiment of the present disclosure.

FIG. 2 is a diagram illustrating an example of a detailed configuration of a ring oscillator cell provided in an apparatus for generating secret information according to an embodiment of the present disclosure.

Referring to FIG. 2, the ring oscillator cell 200 may include a flip-flop element 210, an AND gate 220, an odd number of inverter cells 230-1, 230-2, . . . , and 230-*m* (wherein m is an odd number), and a divide-by-2 divider 240.

The flip-flop element 210 may include a first input terminal 211 receiving an oscillator enable signal, and a second input terminal 212 receiving a system clock signal. An output terminal 213 of the flip-flop element 210 is connected to a first input terminal 221 of the AND gate 220, and a second input terminal 222 of the AND gate 220 is connected to an output of the last inverter cell 230-*p* among an odd number of inverter cells 230-1, 230-2, . . . , and 230-*p* (wherein p is an odd number).

Further, the output from the last inverter cell 230-*p* may be provided to the divide-by-2 divider 240, and the divide-by-2 divider 240 may divide the signal generated on the basis of the ring oscillator cell 200 by two for outputting.

In the meantime, each ring oscillator cell 200 outputs a clock signal having a resonant frequency that is formed on the basis of a manufacturing environment at a semiconductor level. The resonant frequency included in the clock signal may be formed differently.

Further, the ring oscillator cell 200 may be selected through the MUX provided in each of the first and the second PUF information generation units 10 and 20, and a clock signal corresponding to the selected ring oscillator cell 200 may be output. The clock signals may have different resonant frequencies and thus may have different phases. Therefore, the phases of the clock signals provided by the first and the second PUF information generation units 10 and 20 may be detected, and a value obtained by comparing the results of counting the phase differences may be generated. Furthermore, each of the first and the second PUF information generation units 10 and 20 may have multiple ring oscillator cells 200, so the secret key information may be finally generated by combining the phases for respective ring oscillator cells 200 and the value obtained by comparing the result of counting the phase differences.

Hereinafter, an operation of generating secret information according to an embodiment of the present disclosure will be described in detail.

First, in order to select two clock signals to be input as a reference signal and a target signal to the first phase processing unit 31, a signal Target_sel0 is applied to a first MUX 13-1 included in the first PUF information generation unit and a signal Ref_sel0 is applied to a first MUX 23-1 included in the second PUF information generation unit 20. Similarly, in order to select two clock signals to be input as a reference signal and a target signal to the second phase processing unit 32, a signal Ref_sel1 is applied to a second MUX 13-2 included in the first PUF information generation unit 10 and a signal Target_sel1 is applied to a second MUX 23-2 included in the second PUF information generation unit 20.

Then, a signal osc_enable is applied to one or more ring oscillator cells provided in each of the first PUF information generation unit 10 and the second PUF information generation unit 20, thus the ring oscillator cells provided in the first PUF information generation unit 10 and in the second PUF information generation unit 20 are simultaneously operated.

Accordingly, the clock signal output from the first MUX 13-1 included in the first PUF information generation unit 10 may be input as the target signal of the first phase processing unit 31, and the clock signal output from the first MUX 23-1 included in the second PUF information generation unit 20 may be input as the reference signal of the first phase processing unit 31. Further, the clock signal output from the second MUX 23-2 included in the second PUF information generation unit 20 may be input as the target signal of the second phase processing unit 32, and the clock signal output from the second MUX 13-2 included in the first PUF information generation unit 10 may be input as the reference signal of the second phase processing unit 32.

Through this operation, the first phase processing unit 31 detects, on the basis of the clock signal output from the second PUF information generation unit 20, the first phase signal for the clock signal output from the first PUF information generation unit 10 for outputting, and the second phase processing unit 32 detects, on the basis of the clock signal from the first PUF information generation unit 10, the second phase signal for the clock signal output from the second PUF information generation unit 20.

The first and the second counters 51 and 52 provided in the secret key generation module 50 count values of the first and the second phase signals for a predetermined time, respectively, and the comparator 55 compares the results of the counting to generate the secret key information.

For example, when it is checked that the value (for example, frequency) of the first counter is equal to or greater than the value of the second counter, the secret key generation module 50 generates the result value of "1". When it is checked that the value (for example, frequency) of the first counter is relatively smaller than the value of the second counter, the secret key generation module 50 generates the result value of "0".

Figure 3A:
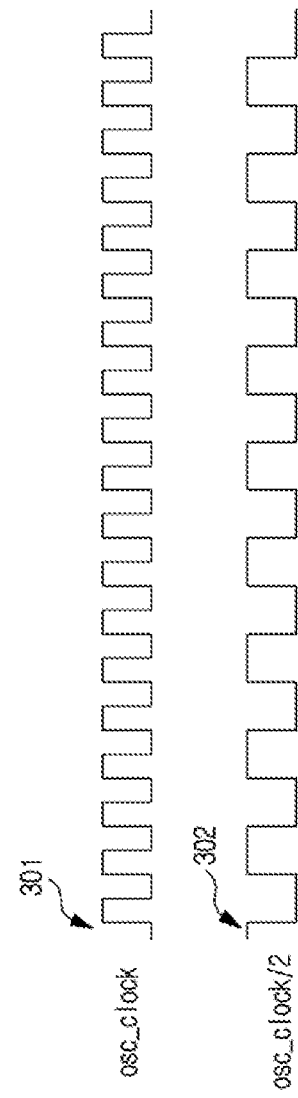

FIGS. 3A and 3B are diagrams illustrating timing of a signal used in an apparatus for generating secret information according to an embodiment of the present disclosure.

First, each ring oscillator cell provided in each of the first and the second PUF information generation units 10 and 20 generates a clock signal osc_clock 301 and converts this into a clock signal osc_clock/2 302, which is obtained from division by two, for outputting. Here, at least one MUX provided in each of the first and the second PUF information generation units 10 and 20 may output the clock signal 302 obtained from division by two as the target signal or as the reference signal selectively. The output selection of the target signal or the reference signal may be performed using a control signal, such as Target_sel0, Tartget_sel1, Ref_sel0, Ref_sel1, and the like.

The clock signals $CLK_{target}/2$ 311 and $CLK_{ref}/2$ 321 output through the one or more MUXs provided in each of the first and the second PUF information generation units 10 and 20 may be input to the first and the second phase processing units 31 and in a crossed manner. The first and the second phase processing units 31 and 32 divide the clock signals $CLK_{target}/2$ 311 and $CLK_{ref}/2$ 321 input as the target signal and the reference signal by two, and use the resulting signals $CLK_{target}/4$ 313 and $CLK_{ref}/4$ 323 to detect the first and the second phase signals.

In practical implementation, the division ratio for the clock signal may be adjusted to division by two, division by four, division by eight, and the like according to an oscillation clock of the oscillator. Regarding detection of the phasedifference, when at the rising edge of the reference signal $CLK_{ref}/4$ 323 obtained from division by four, the target signal $CLK_{target}/4$ 313 obtained from division by four has a value of one, it is determined as detection and a phase detection signal 330 is generated. When the value of zero is detected, the phase detection signal is not generated.

When the phase detection signal is generated, the first counter 51 or the second counter 52 corresponding thereto increases the count value.

An oscillation frequency of an oscillator has a slight difference because hardware uncertainty is influenced according to the manufacturing characteristics, which changes a clock. Therefore, phase detection as described above is possible. As described above, the detected phases are accumulatively counted for a predetermined time, and the accumulatively counted values are compared, thereby generating random secret key information.

Figure 4:
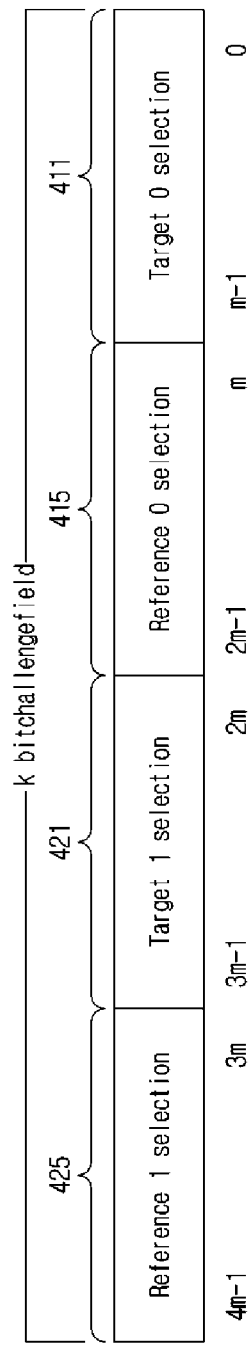
FIG. 4 is a diagram illustrating an example of a control signal used for selecting a ring oscillator cell of an apparatus for generating secret information according to an embodiment of the present disclosure.

FIG. 4 is a diagram illustrating an example of a control signal used for selecting a ring oscillator cell of an apparatus for generating secret information according to an embodiment of the present disclosure.

For example, when each of the first and the second PUF information generation units 10 and 20 includes 32 ring oscillator cells, the apparatus for generating secret information includes total 64 ring oscillator cells. When two phase processing units are provided, each PUF information generation unit selects one target ring oscillator cell and one reference ring oscillator cell. Thus, in FIG. 4, a target 0 field 411 and a reference 0 field 415 are composed of five bits each, total 10 bits, and a target 1 field 421 and a reference 1 field 425 are also composed of five bits each, total 10 bits. Therefore, it is possible to select one piece of secret key information (one or zero) by setting an arbitrary value to total 20 bits. That is, it is a case where one among 32 ring oscillator cells is selected, which results $2^5=32$ and m=5, so it is possible to construct total 20 bits. When using the selection value of the ring oscillator cell, the secret key information (one or zero) finally determined is defined as a "response". Selection information of the ring oscillator cell which is input to obtain one response is defined as a "challenge".

In general, one response to one challenge is defined as a "challenge-response pair" in the PUF, and how much different challenge-response pairs are generated represents the performance of the PUF. That is, various challenge-response pairs need to be present to ensure uniqueness when generating an encryption key and an ID using the pairs.

In the apparatus for generating secret information according to the embodiment of the present disclosure, clock signals output through two PUF information generation units are used as a target signal and a reference signal in a crossed manner so as to generate a count value based on the two phase signals. Further, multiple reference signals and multiple target signals are combined through the MUX provided in the PUF information generation unit.

As described above, through the apparatus for generating secret information according to the embodiment of the present disclosure, a relatively large number of challenge-response pairs are generated compared to the conventional art. For example, when each of the two PUF information generation units includes 32 ring oscillator cells, about one million challenge-response pairs are constructed.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

The exemplary methods described herein were expressed by a series of operations for clear description, but it does not limit the order of performing the steps, and if necessary, the steps may be performed simultaneously or in different orders. In order to achieve the method of the present disclosure, other steps may be added to the exemplary steps, or the other steps except for some steps may be included, or additional other steps except for some steps may be included.

Various embodiments described herein are provided to not arrange all available combinations, but explain a representative aspect of the present disclosure and the configurations about the embodiments may be applied individually or in combinations of at least two of them.

Further, various embodiments of the present disclosure may be implemented by hardware, firmware, software, or combinations thereof. When hardware is used, the hardware may be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a general processor, a controller, a micro controller, and a micro-processor.

The scope of the present disclosure includes software and device-executable commands (for example, an operating system, applications, firmware, programs) that make the method of the various embodiments of the present disclosure executable on a machine or a computer, and non-transitory computer-readable media that keeps the software or commands and can be executed on a device or a computer.

What is claimed is:
1. An apparatus for generating secret information on the basis of a ring oscillator, the apparatus comprising:
multiple hardware physically unclonable function (PUF) information generation units each including at least one ring oscillator cell configured to generate PUF information;
a phase checking unit configured to
cross-check phases for multiple pieces of the PUF information that are output from the multiple PUF information generation units, respectively, and
detect a phase of a clock signal generated through each of the at least one ring oscillator cell; and
a secret key generation unit configured to output secret key information based on a result of comparing the multiple phases received from the phase checking unit;
wherein the at least one ring oscillator cell comprises: a flip-flop element configured to receive an oscillator enable signal and a system clock signal;
an AND gate;
an odd number of inverter cells connected to an output terminal of the AND gate in series; and
a divider configured to divide a clock of a last inverter cell of the odd number of inverter cells by two,
wherein an output of the flip-flop element is connected to a first input of the AND gate, and
an output of the last inverter cell is connected to a second input of the AND gate; and wherein the phase checking unit and the secret key generating unit are integrated in a hardware component.

2. The apparatus of claim 1, wherein the multiple PUF information generation units comprise:
a first PUF information generation unit including the at least one ring oscillator cell and configured to generate first PUF information; and
a second PUF information generation unit including the at least one ring oscillator cell and configured configured to generate to generate second PUF information.

3. The apparatus of claim 2, wherein the phase checking unit comprises:
a first phase processing unit configured to receive the first PUF information output from the first PUF information generation unit as a target signal, receive the second PUF information output from the second PUF information generation unit as a reference signal, and detect a phase between the reference signal and the target signal for outputting; and
a second phase processing unit configured to receive the first PUF information output from the first PUF information generation unit as a reference signal, receive the second PUF information output from the second PUF information generation unit as a target signal, and detect a phase between the reference signal and the target signal for outputting.

4. The apparatus of claim 3, wherein the secret key generation unit comprises:
a first counter configured to count a first phase value output from the first phase processing unit;
a second counter configured to count a second phase value output from the second phase processing unit; and
a comparator configured to compare outputs of the first and the second counters.

5. The apparatus of claim 1, wherein the phase checking unit is configured to receive the multiple pieces of the PUF information as a reference signal and a target signal, and to detect a phase between the reference signal and the target signal for outputting.

6. The apparatus of claim 1, wherein the secret key generation unit comprises:
multiple counters configured to count the multiple phases; and
a comparator configured to compare output values of the multiple counters.

7. A method of generating secret information on the basis of a ring oscillator, the method comprising:
generating and outputting, by multiple hardware physically unclonable function (PUF) information generation units each including at least one ring oscillator cell, PUF information;
checking, by a phase checking unit, phases for multiple pieces of the PUF information that are output from the multiple PUF information generation units;
detecting a phase of a clock signal generated through each ring oscillator cell; and
generating, by a secret key generation unit, secret key information by comparing values that result from counting multiple phases corresponding to the multiple pieces of the PUF information;
wherein the at least one ring oscillator cell comprises: a flip-flop element configured to receive an oscillator enable signal and a system clock signal;
an AND gate;
an odd number of inverter cells connected to an output terminal of the AND gate in series; and
a divider configured to divide a clock of a last inverter cell of the odd number of inverter cells by two;
wherein an output of the flip-flop element is connected to a first input of the AND gate, and
an output of the last inverter cell is connected to a second input of the AND gate;
and wherein the phase checking unit and the secret key generating unit are integrated in a hardware component.

8. The method of claim 7, wherein the generating and the outputting of the PUF information comprises:
generating first PUF information by using the at least one ring oscillator cell; and
generating second PUF information by using the at least one ring oscillator cell.

9. The method of claim 7, wherein the checking of the phases comprises:
receiving the multiple pieces of the PUF information as a reference signal and a target signal, and detecting a phase between the reference signal and the target signal.

10. The method of claim 7, wherein the generating of the secret key information comprises:
counting the multiple phases; and
generating the secret key information by comparing values that result from the counting.

* * * * *